July 23, 1946.  D. ROEDER ET AL  2,404,459
TURRET MOUNTING
Filed March 14, 1944
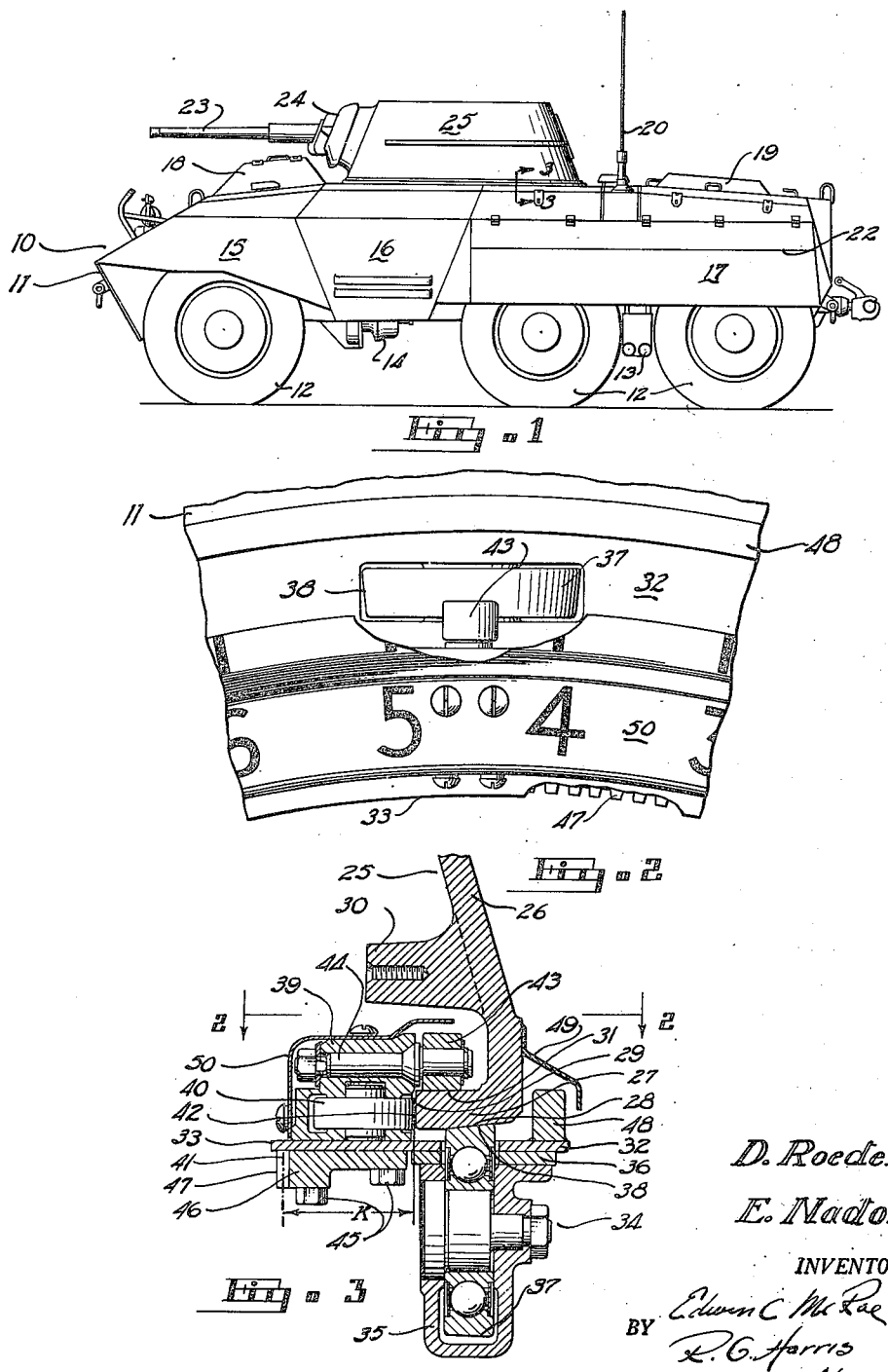
D. Roeder
E. Nador
INVENTORS.
BY Edwin C. McRae
R. C. Harris
Attorneys.

Patented July 23, 1946

2,404,459

UNITED STATES PATENT OFFICE 2,404,459

TURRET MOUNTING

Dale Roeder, Wayne, and Emory Nador, Detroit, Mich., assignors to Ford Motor Company, Dearborn, Mich., a corporation of Delaware Application March 14, 1944, Serial No. 526,362

3 Claims. (Cl. 89—36)

1

This invention relates to the mounting of rotatable platforms on vehicles; and, more particularly, to the construction of mountings for turrets and the like used on military equipment.

In the present case, the invention is shown as applied to the mounting of a rotatable gun turret on an armored car. In military use, the principal requirements of such units are, of course, the protection of personnel and the operating mechanism of the vehicle. Nearly as important is the provision of a smoothly operating and easily rotatable mechanism accurate enough to provide for traversing of the turret gun; and, while free of backlash, sufficiently easy in operation as not to interfere with the mobility of the turret. At the same time, the mounting must be sturdy enough to carry the rather considerable weight of the turret and resist any shocks incident to the impact of projectiles. The mounting must be readily assembled and demountable in the field and must include piloting means to insure that the turret and its driving mechanism are maintained in concentricity in appropriate position on the vehicle's hull. The turret must be freely movable under all conditions. It must incorporate adequate protection against the elements without recourse to structure which, when deformed in action, can cause fouling between the turret and the hull. It must include means for adjusting the vertical hold-down of the turret to compensate for differences in dimension, and there must be a constant relation maintained between the turret mounting and the turret drive means.

The advantage of the present invention is that it incorporates all the desirable features in a mounting which is extremely compact and does not intrude upon the limited interior space of the vehicle. The mounting is fully protected from the exterior and is self-centering with respect to the hull and self-piloting as to concentricity with the turret drive means. It is readily removable and may be adjusted in any of the senses referred in meeting usual conditions. It may be maintained free from backlash and yet is easily rotatable under all circumstances. It insures both an accurate mobile mount for the gun and maximum protection for personnel and the vehicle. It is extremely simple to manufacture and is inherently durable and rugged in its construction.

With these and other objects in view, the invention consists in the arrangement, construction and combination of the various parts of the improved device, as described in the specification, claimed in the claims and illustrated in the accompanying drawing, in which:

Figure 1 is a side elevation of a light armored car embodying the present invention.

Figure 2 is a partial plan view on an enlarged scale of the turret mounting, the turret itself being omitted and a portion of the traversing index ring being broken away to show the construction underneath.

Figure 3 is a partial transverse vertical section through the turret and the mounting device taken substantially as indicated on the line 3—3 of Figure 1.

Referring to Figure 1, 10 indicates generally a light armored car having a hull 11 mounted on six drive wheels 12, the rear four being interconnected by the bogie 13 and the front two being driven through the transfer case 14. The hull is divided roughly into the front or the driver's section 15, the middle or turret section 16, and the aft or engine compartment 17. Direct access to the driver's section 15 is obtained through the hinged hatches 18 and a similar provision is made through the rear hatches 19 for the engine compartment. The turret 25 may have an open top or employ similar hatches. A radio mast 20 and a number of side lockers 22 are provided. A gun 23 having horizontal trunnions is secured in the usual type of mounting 24 on the turret 25.

The turret 25 is substantially in the form of a frustum of a cone, the lower portion being shown in section of Figure 3. This is formed with a sloping wall 26 of substantially uniform thickness and an inturned lower flange 27 of somewhat greater thickness and having a finished surface 28 on the lower face of the flange, a second finished surface 29 at the inner end of the flange and a third finished surface 31 on the upper face of the flange. A boss 30 cast integral with the turret 25 is provided for attachment of a turret control device of the general type shown in copending application, Serial No. 498,152.

Referring particularly to Figure 3, the hull 11 comprises skin 32 having a large circular aperture formed therein corresponding roughly to the interior of the turret and having the edge 33. The turret 25 is supported on the roller assemblies 34 which are spaced, in this instance, at intervals of 120° around the hull opening adjacent the edge 33. These roller assemblies 34 include a housing 35 secured beneath the skin 32 through a spacer 36 and enclosing a ball bearing assembly 37 having a tapered outer surface 38 adapted to support the finished surface 28 on the lower face of the turret flange. The roller assembly 34 also includes a second housing 39, above the skin 32, in which are rotatably mounted a roller 40 having a vertical face 42 adapted to co-operate with the finished surface 29 on the inner end of the turret flange to retain the turret in concentricity with the opening in the hull; and a second roller 43 mounted eccentrically on a rotatable bolt 44 and engaging the finished surface 31 on the upper face of flange 27 of the turret and serving to restrain the turret from vertical upward movement. The purpose of mounting this second roller 43 on the eccentric bolt is to permit a means of adjustment for variation in the diameter of the turret which is otherwise compensated for by the tapered surface 38 of the bearing 37, but which results in the vertical displacement relative of the flange.

The second housing 39 rests on top of the skin 32 and is secured in place on it by bolts 45, extending through the internal ring gear 46 beneath the skin 32. The position of the bolt holes in the second housing and the ring gear is correlated to insure a fixed distance between the pitch circle 41 on the teeth 47 of the ring gear and the vertical face 42 of the roller 40. This insures relative absolute concentricity between the ring gear and the finished inner end of the flange 29 of the turret, so that free rotation is guaranteed. The relative position of the boss 30, upon which is mounted the turret control, is located with respect to the face 42 so that the turret control meshes with the teeth 47 in the ring gear and is maintained in predetermined relationship. A heavy barrier ring 48 is secured to the upper surface of the skin 32 outwardly of the turret 25 to protect the interstice between the turret and the skin from projectiles or fragments. The external protection is completed by a light metal shield 49 secured to the turret and extending outwardly and partially over the barrier ring 48 serving primarily to weather proof the interior of the vehicle and to prevent the entry of small objects between the turret and the ring. However, this is made of relatively light gage stock and if bent down will not impede the rotation of the turret. The assembly is completed by a calibrated azimuth ring 50 which is secured over and serves as the cover for the second housing 39. By reasons apparent from the method of attachment, this ring is also maintained in concentricity with the turret and hence with the gun mounted in the turret, insuring an accurate means of indexing it.

The operation of the device is believed to be clear from the foregoing description. The advantage of the present construction is that it affords a free running, yet accurate support for the rotating turret 25. The support is centered between a plurality of vertical and horizontal members 37, 40 and 43 mounted on the hull 11. The horizontal support does not require particularly fine adjustment, since variations in relative position are compensated for by the tapered bearing surfaces 28 and 38 between the turret 25 and the bearing 37 proper. The horizontal supporting means, however, is subject to close control as to relative concentricity of the turret and the turret driving means engaging the teeth 47 which is most important to insure a free and easy-running turret without requiring extreme care in machining the components. When it is understood that the diameter of the turret is at least five or six feet, the difficulty of maintaining precise concentricity between it and the ring gear 46 will be at once apparent. However, by utilizing the ring gear 46 as one member of the roller assembly and piloting the horizontal bearing 40 for the turret from the ring gear, all difficulties which ordinarily would arise in this connection are avoided. At the same time, the second housing 39 includes a hold-down bearing 43 to restrain the vertical movement of the turret and this is preferably adjustably mounted to compensate for any difference existing as a result of variable positions of the main vertical bearing 37. The device is confined entirely within the hull 11 and turret 25 of the tank, which is a prime consideration in a military vehicle. The interstice between the hull and the turret is fully protected without interfering with the free running of the device and there is no opportunity for external bodies to interfere with the free movement of the turret. Although the supporting means are entirely within the body of the vehicle they are of small size and do not interfere with the interior operation of it. The vertical bearing housings 35—of which there are only three—extend downwardly not more than four inches, while the horizontal bearing housings 39 are concealed beneath and form the support for the conventional calibrated azimuth ring 50 and hence do not intrude upon the interior at all.

The advantages of the present construction, from the standpoint of efficiency and protection, are at once apparent. However, the greatest advantage lies in the facilitation of the machine process and insuring a pileated bearing and complete concentricity between the component parts under the device—although extreme care in manufacture is not required. This follows from the interrelation of the several parts of the mounting to secure this object.

Some changes may be made in the components of the device disclosed without departing from the spirit of the invention, and it is the intention to cover by the claims, such changes as may reasonably be included within the scope thereof.

The invention claimed is:

1. In a bearing construction for a turret or the like, said turret characterized in having an inturned lower flange, a supporting hull having a substantially horizontal upper skin and an aperture therein, a plurality of circumferentially spaced bearing assemblies about said aperture each comprising a roller bearing rotatably supported within said hull and beneath said skin and extending partially thereabove to engage the lower surface of said flange, correspondingly spaced co-operating horizontal roller bearings engaging the inner circumferential face of said flange, housings mounted on said hull above said skin within said turret and rotatably supporting said last-named bearings, hold-down roller bearings mounted in said housings and engaging the upper surface of said flange, an internal ring gear within said hull beneath said skin and securing means extending through said ring gear and skin and said housings to correlate the positions of the engaging face of said horizontal bearings and the teeth on said ring gear.

2. The structure of claim 1 which is further characterized in that said vertical bearings have a tapered face engaging a correspondingly tapered face on the lower surface of said flange and said hold-down bearings are mounted to permit vertical adjustment above said tapered faces.

3. The structure of claim 1 which is further characterized in that said vertical bearings have a tapered facing engaging a correspondingly tapered face on the lower surface of said flange, said hold-down bearings are mounted in said housing to permit vertical adjustment therein above said tapered faces, and the teeth of said ring gear are spaced outwardly of the edge of said aperture and arranged substantially vertically.

DALE ROEDER.
EMORY NADOR.